(12) United States Patent
Bohrmann

(10) Patent No.: US 11,685,294 B2
(45) Date of Patent: Jun. 27, 2023

(54) DEVICE FOR REDUCING KINETOSIS-RELATED DISORDERS OF AN OCCUPANT DURING DRIVING MODE OF A VEHICLE

(71) Applicant: Daimler AG, Stuttgart (DE)

(72) Inventor: Dominique Bohrmann, Trier (DE)

(73) Assignee: Mercedes-Benz Group AG, Stuttgart (DE)

(*) Notice: Subject to any disclaimer, the term of this patent is extended or adjusted under 35 U.S.C. 154(b) by 0 days.

(21) Appl. No.: 17/289,895

(22) PCT Filed: Oct. 31, 2019

(86) PCT No.: PCT/EP2019/079784
§ 371 (c)(1),
(2) Date: Jun. 24, 2021

(87) PCT Pub. No.: WO2020/089370
PCT Pub. Date: May 7, 2020

(65) Prior Publication Data
US 2022/0001773 A1    Jan. 6, 2022

(30) Foreign Application Priority Data
Oct. 31, 2018  (DE) .................... 10 2018 008 627.6

(51) Int. Cl.
*B60N 2/10*   (2006.01)
*B60N 2/90*   (2018.01)
(Continued)

(52) U.S. Cl.
CPC ............. *B60N 2/10* (2013.01); *B60N 2/0232* (2013.01); *B60N 2/806* (2018.02); *B60N 2/976* (2018.02); *B60R 22/34* (2013.01)

(58) Field of Classification Search
CPC .......... B60N 2/10; B60N 2/976; B60N 2/806; B60N 2/0232; B60R 22/34
(Continued)

(56) References Cited

U.S. PATENT DOCUMENTS 5,882,060 A   3/1999  Walk et al.
7,073,863 B1  7/2006  Low et al.
(Continued)

FOREIGN PATENT DOCUMENTS

CN   101497321 A   8/2009
CN   101537808 A   9/2009
(Continued)

OTHER PUBLICATIONS

PCT/EP2019/079784, International Search Report (PCT/ISA/210 and PCT/ISA/220) dated Jan. 29, 2020, enclosing Written Opinion of the International Searching Authority (PCT/ISA/237), with partial English translation (Seventeen (17) pages).
(Continued)

*Primary Examiner* — Mark R Wendell
(74) *Attorney, Agent, or Firm* — Crowell & Moring LLP

(57) ABSTRACT

A device for reducing kinetosis-related disorders of an occupant of a vehicle includes a vehicle seat with a headrest. A seat belt is assigned to the vehicle seat which is configured to increase a connection of the occupant to the vehicle seat before an onset of an acceleration. An actuator system is coupled to the headrest which is configured to move the headrest automatically, at least in sections, counter to an expected direction of an acceleration of a head of the occupant before the onset of the acceleration. The seat belt is tightenable by a reversible belt tensioner before the onset of the acceleration.

12 Claims, 2 Drawing Sheets

(51) Int. Cl.
  *B60N 2/806* (2018.01)
  *B60N 2/02* (2006.01)
  *B60R 22/34* (2006.01)

(58) Field of Classification Search
  USPC ...................................................... 297/354.1
  See application file for complete search history.

(56) References Cited

U.S. PATENT DOCUMENTS

| | | | | |
|---|---|---|---|---|
| 10,457,179 | B1* | 10/2019 | Kentley-Klay | ........ B60N 2/879 |
| 2010/0036565 | A1* | 2/2010 | Bernzen | ................ B60R 21/013 |
| | | | | 701/45 |
| 2018/0236907 | A1* | 8/2018 | Ohno | .................... B60N 2/0276 |
| 2020/0142417 | A1* | 5/2020 | Hudecek | ........... B60W 30/0953 |

FOREIGN PATENT DOCUMENTS

| | | |
|---|---|---|
| CN | 102350961 A | 2/2012 |
| DE | 24 41 705 A1 | 3/1976 |
| DE | 10 2004 024 548 A1 | 12/2005 |
| DE | 10 2006 015 785 A1 | 10/2006 |
| DE | 102009013338 * | 10/2009 |
| DE | 10 2013 016 726 A1 | 7/2014 |
| DE | 10 2013 224 666 A1 | 6/2015 |
| DE | 10 2016 009 137 A1 | 2/2017 |
| DE | 10 2016 222 800 A1 | 5/2018 |
| EP | 2 987 684 A1 | 2/2016 |
| JP | 2-57452 A | 2/1990 |
| JP | 4-123200 A | 4/1992 |
| JP | 7-67744 A | 3/1995 |
| JP | 2005-88675 A | 4/2005 |

OTHER PUBLICATIONS

German-language German Office Action issued in German application No. 10 2018 008 627.6 dated Jul. 2, 2019 (Six (6) pages).
Chinese Office Action issued in Chinese application No. 201980071710.4 dated Aug. 23, 2022, with partial English translation (Ten (10) pages).
Chinese Office Action issued in Chinese application No. 201980071710.4 dated Feb. 24, 2023, with partial English translation (Ten (10) pages).

* cited by examiner

DEVICE FOR REDUCING KINETOSIS-RELATED DISORDERS OF AN OCCUPANT DURING DRIVING MODE OF A VEHICLE

BACKGROUND AND SUMMARY OF THE INVENTION

The invention relates to a device for reducing kinetosis-related disorders of an occupant during driving mode of a vehicle having a vehicle seat, having an automatically moveable headrest of the vehicle seat and a seat belt assigned to the vehicle seat. Furthermore, the invention relates to a vehicle having such a device.

From JP H0767744 A, an automatically moveable headrest attached to a vehicle seat is known. The headrest is fixed to the vehicle seat by means of a fixing rod comprising a protective plate, a cylinder and a headrest fixing member. In addition, the fixing rod includes a head position detection device and an impact intensity detection device. When the head accelerates or decelerates in the longitudinal direction due to a collision of the vehicle, the head position is detected by the head position detection device, and the impact intensity detection device detects an impact intensity based on an expansion or contraction of the cylinder. A signal processing and output control device sends a cylinder control signal in the form of a pneumatic pressure and an oil pressure to the automatically moveable headrest, which is then positioned such that a backward acceleration is reduced.

Furthermore, a compensation device for a vehicle for compensating a driving movement of the vehicle is known from DE 10 2016 222 800 A1, wherein the compensation device has a detection unit for detecting a direction or acceleration of the driving movement, an evaluation unit for evaluating the detected driving movement, and an adjustment unit for positioning a regulation unit relative to the evaluated driving movement.

DE 10 2006 015 785 A1 describes a vehicle seat arrangement comprising a seat back, a headrest configured for movement between a first position and a second position relative to the seat back, a pre-tensioning member which pre-tensions the headrest from the first position to the second position, and a holding mechanism which can be operated to hold the headrest in any position between the first position and the second position. Furthermore, the holding mechanism can be operated to release the headrest for movement between the first position and the second position.

Furthermore, DE 10 2016 009 137 A1 describes a method of kinetosis-related disorders, DE 10 2013 224 666 A1 describes a motor vehicle seat, and DE 24 41 705 A1 describes a seat for fatigue-free sitting.

The object of the invention is to specify a device, which is improved in comparison with the prior art, for reducing kinetosis-related disorders of an occupant during the driving mode of a vehicle, and a vehicle having such a device.

A device for reducing kinetosis-related disorders of an occupant during driving mode of a vehicle comprises a vehicle seat. According to the invention, the vehicle seat comprises an automatically moveable headrest which is actively moveable for acceleration compensation or acceleration reduction. Furthermore, a connection of the occupant to the vehicle seat is increased at least by means of a seat belt assigned to the vehicle seat before the onset of acceleration.

By means of a device designed in such a way, the performance of activities such as reading, in particular during autonomous driving of the vehicle, can be made possible despite an increased risk of kinetosis. The vehicle seat enables other activities to be carried out in the vehicle, wherein the risk of kinetosis-related disorders occurring is at least substantially reduced.

Kinetosis, the so-called motion sickness, is characterized in particular by occurring symptoms such as fatigue, lack of focus, dizziness, paleness, headaches, sweating and/or nausea.

In this case, the headrest is coupled to an actuator system which is designed to automatically move the headrest, at least in sections, counter to an expected direction of acceleration of at least the head of the occupant before the acceleration occurs. As a result, the occupant's head rests against the headrest, which has a concave shape, wherein the head is laterally enclosed by the headrest, such that acceleration-related diverse lateral and longitudinal movements of the head can be prevented to the greatest possible extent. An imposed dynamic of the head is thus compensated by active compensation movements, wherein a sustained contact between the head and the headrest can be implemented by means of the actuator system. The headrest is capable of both translational (in the longitudinal direction of the vehicle) and rotational movements.

To increase the occupant's connection to the vehicle seat, the seat belt assigned to the vehicle seat is coupled to a reversible belt tensioner for tightening the fastened seat belt before the onset of acceleration. If it is determined that the vehicle is about to undergo lateral acceleration, in particular due to cornering, the seat belt can be tightened by means of the belt tensioner as a comfort function, such that an acceleration of the head and thus the risk of kinetosis-related disorders of the occupant occurring is substantially reduced.

A seat frame of the vehicle seat is, in one development of the vehicle seat, rotatably mounted at least in sections around a vehicle transverse axis, such that pitching movements of the vehicle can be compensated. A rotation around the vehicle transverse axis occurs with relatively slight adjustment of an inclination of a seat back of the vehicle seat, such that a so-called body angle chain remains approximately the same in comparison to that of the occupant when the vehicle seat is in an upright position. In this way, on the one hand, there is the possibility to rotate the complete seat around the vehicle transverse axis, while the ratio of the seat back to the seat cushion remains unchanged. On the other hand, in case of dynamic changes in the position of the vehicle occupant, it is also possible to change only the position of the seat back or the headrest.

In this case, the vehicle seat is coupled to a torque motor and/or a linear drive with transmission, wherein the torque motor and/or the linear drive with transmission are designed for an at least sectional rotation of the vehicle seat around the vehicle transverse axis. Such a torque motor has relatively high torques at relatively low speeds.

One possible embodiment of the vehicle seat provides that a seat frame of the vehicle seat is rotatably mounted at least in sections around a vehicle vertical axis by means of a rotary plate. In this way, the entire body of the vehicle occupant can be rotated in the direction of the inside of the curve before or at the onset of lateral acceleration. In doing so, the rotary plate can additionally be used to position the vehicle seat within the vehicle, such that the vehicle seat can be positioned, for example, in the direction of the rear area or front passenger when an occupant on the vehicle seat is not susceptible to kinetosis.

Alternatively or additionally, the vehicle seat comprises a seat back and a vertically displaceable shoulder clamp extendable from the seat back for connecting at least an upper body of the occupant to the vehicle seat. By means of the extended shoulder clamp, it is possible to reduce the head dynamics of the occupant, such that the occurrence of kinetosis can be largely excluded.

In one possible embodiment, the shoulder clamp comprises padding, in which at least one vibration motor and/or an air cushion is/are integrated. This makes it possible to use the shoulder clamp for massage purposes if required.

In a further alternative or additional embodiment, the vehicle seat comprises a seat back and a flat fabric which can be pulled out of a side panel of the seat back, one end of which fabric is fastened inside the side panel and the opposite end of which can be connected to an opposite side panel of the seatback for the flat connection of the upper body of the occupant. The flat fabric forms a kind of blanket and can be stretched over the body, in particular the upper body of the occupant, such that a flat connection of the occupant to the vehicle seat can be implemented.

In addition, the invention relates to a vehicle having such a device for introducing preventative measures in order to be able to prevent the occurrence of kinetosis in an occupant as far as possible. Exemplary embodiments of the invention are explained in more detail below using drawings.

DETAILED DESCRIPTION OF THE DRAWINGS

Figure 1:
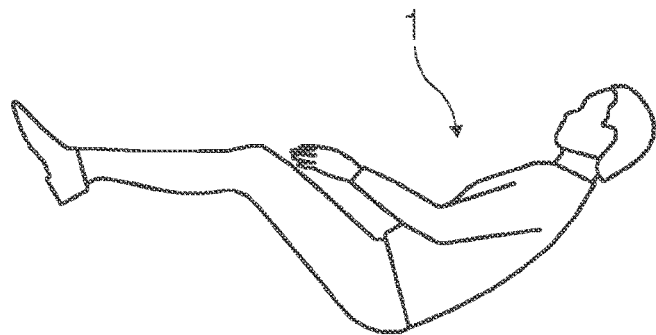
FIG. 1 shows, schematically, an occupant of a vehicle in a reclining position.

Parts corresponding to each other are provided with the same reference numerals in all figures.

Figure 3:
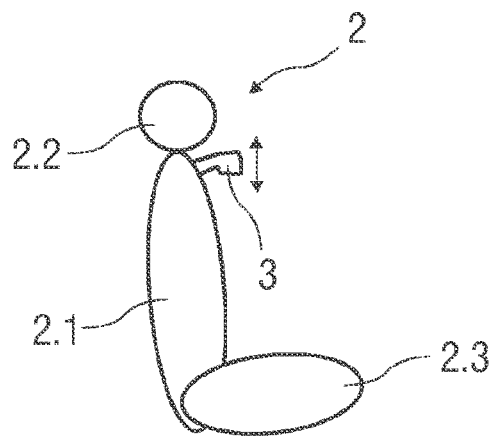
FIG. 3 shows, schematically, a vehicle seat having a shoulder clamp for fixing the occupant in place.
Figure 4:
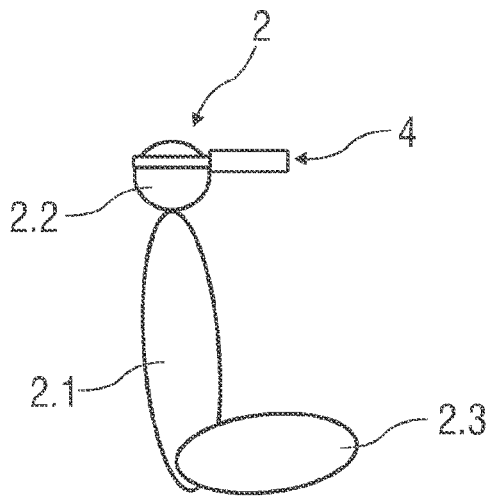
FIG. 4 shows, schematically, a vehicle seat having a headband for fixing an occupant's head in place.

FIG. 1 shows an occupant 1 of a vehicle not depicted in more detail on a vehicle seat 2 depicted in more detail in FIGS. 3 and 4.

If the occupant 1 is a vehicle user, i.e., a driver of the vehicle, and the vehicle has an assistance system for autonomous driving, the occupant 1 can perform other activities during autonomous driving. By way of example, the occupant 1 can read a book or watch a film while the vehicle is driving to its destination.

Since the occupant 1, who may also be a front passenger or another occupant 1 of the vehicle, is distracted from the driving action and concentrates on the other activity, there is a risk of kinetosis, so-called travel or motion sickness, occurring.

The kinetosis can also occur in a front passenger or another occupant 1 in the rear area of the vehicle if the vehicle does not have the assistance system for autonomous driving.

Kinetosis refers to physical reactions such as paleness, headaches, nausea, vomiting and dizziness which are triggered in an occupant 1 by an unfamiliar movement, in particular in a vehicle. The physical reactions are referred to as kinetosis-related disorders or symptoms.

In order to at least substantially reduce the risk of kinetosis-related disorders occurring in the occupant 1, a vehicle seat 2 described below is provided.

The vehicle seat 2 comprises a seat back 2.1 having a headrest 2.2 and a seat cushion 2.3.

The headrest 2.2 combines various functions which, individually or in combination, can lead to a reduced expression of kinetosis. In particular, on a side facing the occupant 1, the headrest 2.2 has a head support consisting of an elastic material which allows the head of the occupant 1 to sink in, in particular in the event of a collision. When the headrest is loaded by an impact of the head, the material solidifies, for example by means of electromechanical processes which can be controlled manually or automatically by the vehicle. After the material has solidified, the head lies stabilized and fixed against the individual, concave-shaped headrest 2.2 and is laterally enclosed by it.

Functionalities of the headrest 2.2 are used in particular, but not exclusively, when the seat back 2.1 is in a flat tilted position. In a substantially upright position of the seat back 2.1, it moves forwards in the direction of the occupant 1 up to his/her head.

By means of a corresponding actuator system in the headrest 2.2, which is not depicted in more detail, and a sensor system of the vehicle, a future dynamic of the head is determined, in particular calculated, and prevented by diverse lateral and longitudinal movements of the headrest 2.2. The dynamics of the head which are thus imposed are thus compensated for by active compensating movements.

On the basis of a future trajectory of the vehicle, which is determined by means of map data, detected signals of radar-based, lidar-based and/or ultrasound-based detection units and/or on the basis of camera information, a lateral acceleration acting on the head of the occupant 1 can be determined. In order to increase the accuracy of the determination, an algorithm can additionally be based on a biomechanical model which determines the dynamics of the head via additional input variables, such as a body position in space as well as individual anthropometric data of the occupant 1.

Depending on the amount and direction, the head performs an active movement by means of the headrest 2.2 against the centrifugal force, i.e., in the direction of an inside curve. This movement corresponds to a natural compensation strategy of an occupant 1 who performs a driving task in relation to the vehicle and instinctively executes this movement. Also during braking and acceleration maneuvers of the vehicle, the headrest 2.2 pre-emptively performs a movement against the expected direction of acceleration. A neck musculature of the occupant 1 is thereby activated and a reduction of kinetosis-related disorders is to be expected.

The dynamics of the headrest 2.2 can be implemented by various technical solutions, including electromechanical plungers integrated into the head support and/or actuators arranged at the edge which only indirectly influence the head support.

In particular, the head of the occupant 1 is moved preventively by means of the moveable headrest 2.2 before an acceleration of the vehicle occurs, wherein this movement is actively and/or passively modelled on a natural movement of the head during orientation or preventively stabilizes the head laterally before driving into a bend or during a braking maneuver of the vehicle.

For this purpose, the head of the occupant 1 can be fixed laterally by means of a pincer-like device which is attached to the headrest 2.2 and thereby stabilized laterally.

In addition, it can be provided that the headrest 2.2 executes high-frequency vibrations which are introduced locally or extensively into the head of the occupant 1 in order to influence stimulus detection and stimulus processing of at least one perception channel, in particular of the equilibrium organ of the occupant 1. The execution of the oscillations can be based on versatile variants.

As an alternative or in addition to the movement of the headrest 2.2 in order to compensate for or at least reduce the acceleration, it is provided to rotatably mount the vehicle seat 2 around a vehicle transverse axis, such that the occupant 1 is in in a reclining position as depicted in FIG. 1.

For this purpose, a seat frame of the vehicle seat 2 is mounted on a slide guide, by means of which a rotation of the vehicle seat 2 can be implemented and thus a reclining position in the vehicle is made possible. The rotation around the vehicle transverse axis, which the vehicle performs during a pitching movement, takes place with comparatively little adjustment of an inclination of the seat back 2.1, such that a so-called body angle chain corresponds to the that of the occupant 1 when the vehicle seat 2 is in an upright position.

A support for the feet of the occupant 1 is provided by a shelf which can be extended on the vehicle seat 2 and is not shown. From the point of view of passive safety of the vehicle, slipping under a seat belt, the so-called submarining effect, is prevented as far as possible despite the reclining position of the occupant 1.

A seat support surface supports the body of the occupant 1 axially and holds him/her in position. In the event of a comparatively strong deceleration of the vehicle, i.e., a negative acceleration, set-up kinematics of the vehicle seat 2 help to successively reduce occurring forces.

Provided that the vehicle accelerates predominantly in the direction of the vehicle longitudinal axis, for example in start-stop traffic, a conventional alignment of the vehicle seat 2 is recommended. However, in order to reduce the accelerations acting on the equilibrium organ, a compensating movement of the vehicle seat 2 is induced against the occurring acceleration. In other words, the vehicle seat 2 performs a corresponding movement in the direction of the vehicle longitudinal axis, i.e., longitudinally. An amount of relative movement between the vehicle and occupant 1 is thus reduced, if not eliminated. The compensating movement of the vehicle seat 2 is executed exactly just before the head of the occupant 1 moves in the direction of the vehicle longitudinal axis. Thus, a whipping motion of a neck-head link chain of the occupant 1 is avoided to the greatest extent possible. By way of example, linear acceleration of the vehicle seat 2 is effected by means of at least one pre-tensioned spring element and a linear drive, wherein a travel distance of the vehicle seat 2 of, for example, 15 cm is sufficient.

If, in addition, transverse vehicle accelerations occur due to cornering, a changed axis of movement of the occupant 1 is recorded by a vectorial addition of both acting accelerations. In order to reduce the discrepancy between this changed axis of movement and an alignment of a central axis of the vehicle seat 2, it is provided to fasten the seat frame of the vehicle seat 2 to a rotary plate which is not depicted in more detail. By means of the rotary plate, a rotation of the vehicle seat 2, for example by 5°, around a vehicle vertical axis, around which the vehicle rotates during a so-called yaw movement, is made possible. The vehicle seat 2 can thus automatically align itself in the direction of the prevailing vehicle acceleration in the direction of the vehicle longitudinal axis and vehicle transverse axis in order to reduce kinetosis-related disorders. Here too, use is made of detected anticipatory signals from the vehicle's detection units, in particular the environment sensor system, such that the rotation of the vehicle seat 2 takes place before the acceleration occurs.

In particular, the rotational movement of the vehicle seat 2 both around the vehicle transverse axis and around the vehicle vertical axis can be implemented by means of at least one torque motor and/or a linear drive with a corresponding transmission ratio.

There are the two possibilities of either rotating the complete vehicle seat 2 around a vertical or transverse axis or only the seat back 2.1 or the headrest 2.2, which will be sufficient in most cases for the case of a dynamic change in the position of the occupant 1.

The occurrence of potential Coriolis forces acting on the occupant 1, i.e., Coriolis accelerations, are thus largely avoided, which are often the cause of comparatively strong kinetosis-related disorders. Arbitrary head movements outside a prevailing axis of movement lead significantly to kinetosis. One of the reasons for this is the provocation of an intra-vestibular sensory conflict within the organ of equilibrium due to the Coriolis forces.

Figure 2:
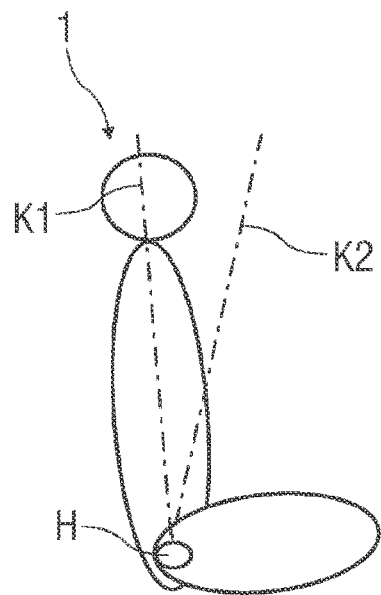
FIG. 2 shows, schematically, an occupant having drawn-in body axes and a hip point.

FIG. 2 shows the occupant 1 in a highly simplified manner, wherein a hip point H, a body axis K1 and a further body axis K2 displaced in front are also depicted.

In order to reduce kinetosis-related disorders of the occupant 1, it is provided to initiate a belt tensioning as an anticipation measure and to connect the occupant 1 to the vehicle seat 2.

To increase the effectiveness of the connection, a belt routing can be adapted accordingly and/or another connecting system, which is described below, is used.

The aim of connecting the occupant 1, in particular his/her upper body, to the vehicle seat 2 is to substantially reduce the dynamics of the head of the occupant 1. The connection points of the occupant 1 to the vehicle seat 2 are elementary in this respect, as the upper body and in particular the head of the occupant 1 rotates around the hip point H during comparatively strong accelerations in the direction of the vehicle longitudinal axis. The occupant 1 shifts, such that he/she is in a position corresponding to the further body axis K2.

Connecting the occupant 1 to the vehicle seat 2 via the shoulders, the head and/or the entire upper body can reduce the head and/or body dynamics and restrict kinetosis in a lasting manner.

In addition, the side bolsters of the seat back can be pre-emptively inflated by inflatable elements present in the side bolsters to provide direction-dependent anticipation of the future trajectory, particularly during secondary activities, without having to visually orientate outwards. In addition, the body is stabilized by the inflated cushions.

For this purpose, the shoulder clamp 3 shown in FIG. 3 may be provided, which is vertically displaceable and has a padding not depicted in more detail. The shoulder clamp 3 is attached to both sides of the seat back 2.1 and moves automatically from an upper starting position to a contact point between the neck of the occupant 1 and the padding of the shoulder clamp 3. In one possible embodiment, at least one vibration motor and at least one air cushion are integrated into the padding, such that the shoulder clamp 3 can additionally assume a massage function.

A further connection possibility not depicted in more detail can be formed by a flat fabric in the form of a blanket, which is arranged in a side panel—not shown—of the vehicle seat 2 and can be pulled out if required. In this case, one end is firmly connected to the vehicle seat 2, wherein an opposite end can be fastened to the opposite side panel, for example based on a lock principle. The blanket as a flat fabric can be unrolled and extends over an upper body of the occupant 1, wherein the flat fabric is stretched and serves for the whole body connection of the occupant 1 to the vehicle seat 2, in particular for the upper body connection to the vehicle seat 2.

Transversely running belts can be integrated into the flat fabric, which enable a tightening over the entire upper body of the occupant 1. In addition, a number of heating elements can be integrated into the flat fabric in order to increase comfort for the occupant 1 in winter, amongst other things.

By way of example, a vibration motor can also be integrated into the flat fabric, which vibrates at a predetermined frequency in the area of the upper body, in particular the chest of the occupant 1, and thereby influences a breathing frequency of the occupant 1 to reduce kinetosis-related disorders. By means of the flat fabric, the occupant 1 can thus be tactilely stimulated.

In particular when moving against the direction of travel and/or when carrying out activities in the vehicle, information for the occupant 1 about impending acceleration is limited. An adaptation of a belt route as well as an early locking at comparatively low G-forces can lead to a stabilization of the upper body and in particular of the head of the occupant 1 during driving.

Figure 5:
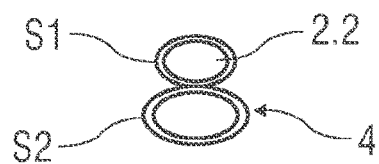
FIG. 5 shows, schematically, a top view of a headrest having the headband attached.

A headband 4 shown in FIGS. 4 and 5 can be used to connect the head of the occupant 1 to the vehicle seat 2. In this case, the headband 4 is doubled and has the shape of an 8 in plan view. One loop S1 is used for fastening to the headrest 2.2 and another loop S2 encloses the head of the occupant 1. As an alternative to the design as a headband 4, a cap shape can also be selected.

The headband 4 also has the option of being fitted with an insert soaked in essential oils or a cooling or warming insert. This is in direct contact with the forehead/temples and thus prevents manifestations of primarily kinetosis-induced headaches.

If the form of a cap is chosen, there is also the possibility of integrating electrodes into the cap which make it possible to detect kinetosis preventively (by recording an EEG), in the best case before the first symptoms appear. In addition, the occurrence of kinetosis can be prevented by targeted electrical stimulation of the head via these electrodes.

The invention claimed is:

1. A device that reduces kinetosis-related disorders of an occupant of a vehicle in an autonomous driving mode of the vehicle, comprising:
   a vehicle seat with a headrest;
   a seat belt assigned to the vehicle seat which is configured to increase a connection of the occupant to the vehicle seat before an onset of an acceleration;
   an actuator system coupled to the headrest which is configured to move the headrest automatically, at least in sections, counter to an expected direction of an acceleration that will act on a head of the occupant before the onset of the acceleration which reduces the kinetosis-related disorders of the occupant of the vehicle, wherein the acceleration that will act on the head of the occupant and will cause the kinetosis-related disorders of the occupant of the vehicle is determined on a basis of a future trajectory of the vehicle; and
   a reversible belt tensioner, wherein the seat belt is tightenable by the reversible belt tensioner before the onset of the acceleration;
   wherein the actuator system is configured to move the headrest automatically counter to the expected direction of the acceleration in a lateral direction and in a longitudinal direction.

2. The device according to claim 1, wherein a seat frame of the vehicle seat is rotatably mounted at least in sections around a transverse axis of the vehicle.

3. The device according to claim 2, wherein the vehicle seat is coupled to a torque motor and/or a linear drive with transmission, wherein the torque motor and/or the linear drive with transmission are configured for an at least sectional rotation of the vehicle seat around the transverse axis.

4. The device according to claim 1, wherein a seat frame of the vehicle seat is rotatably mounted at least in sections about a vertical axis of the vehicle by a rotary plate.

5. The device according to claim 1, wherein the vehicle seat has a seat back and a vertically displaceable shoulder clamp which is extendible from the seat back for connecting at least an upper body of the occupant to the vehicle seat.

6. The device according to claim 5, wherein the shoulder clamp has a padding and wherein a vibration motor and/or an air cushion are integrated in the padding.

7. The device according to claim 1, wherein the vehicle seat has a seat back, a first side panel, a second side panel, and a flat fabric which is pullable out of the first side panel, wherein a first end of the flat fabric is fastened inside the first side panel and a second end of the flat fabric is connectable to the second side panel.

8. A vehicle, comprising:
   the device according to claim 1.

9. The device according to claim 1, wherein the future trajectory of the vehicle is determined by map data.

10. The device according to claim 1, wherein the future trajectory of the vehicle is determined by signals detected by a radar-based detector or by a lidar-based detector or by an ultrasound-based detector.

11. The device according to claim 1, wherein the future trajectory of the vehicle is determined by camera information.

12. The device according to claim 1, wherein the acceleration that will act on the head of the occupant is additionally determined on the basis of an algorithm that is based on a biomechanical model which determines dynamics of the head of the occupant via an input variable and wherein the input variable is a body position in space of the occupant or individual anthropometric data of the occupant.

* * * * *